UNITED STATES PATENT OFFICE.

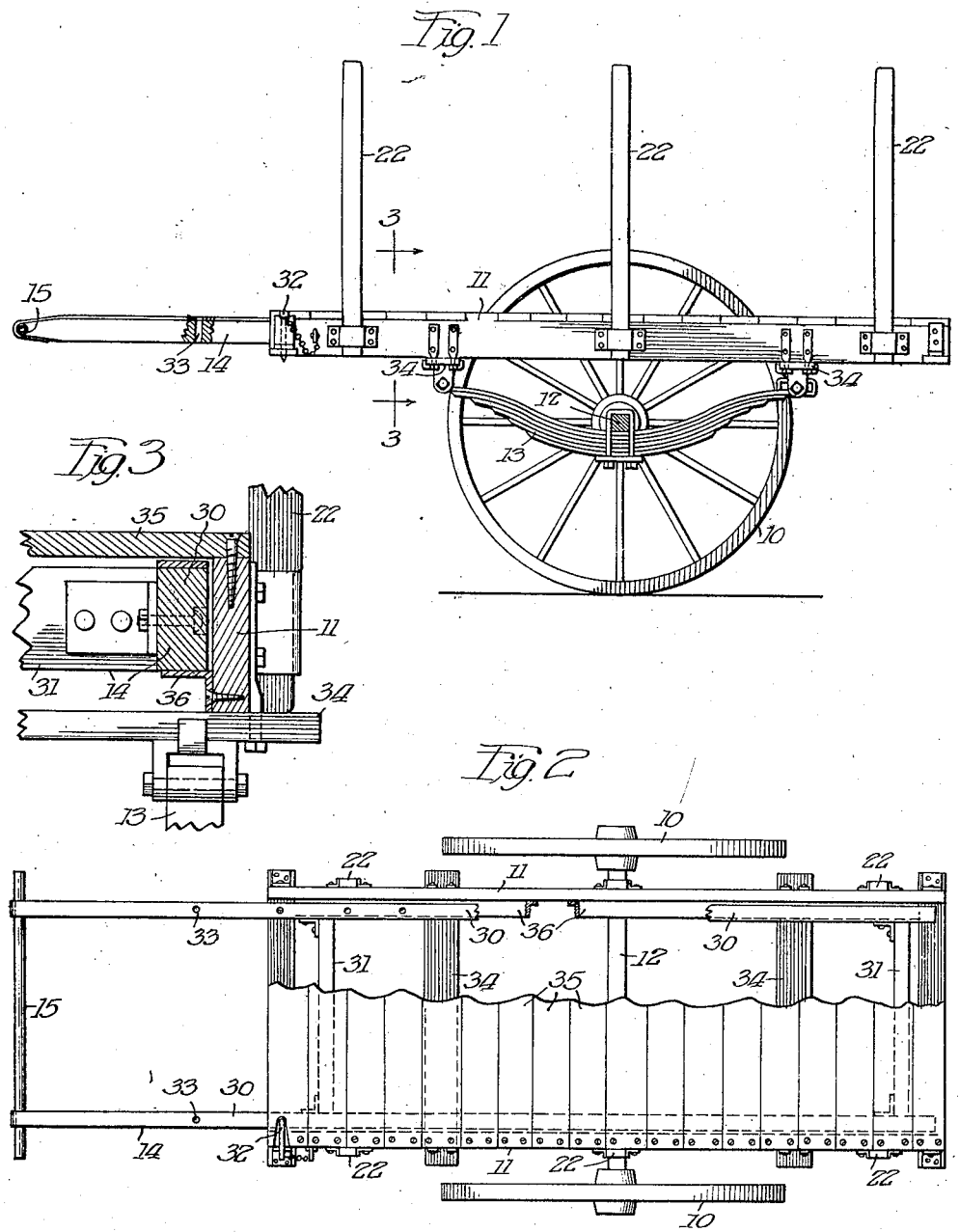

WILLIAM T. DAUM, OF OAK PARK, ILLINOIS.

AUTOMOBILE-TRAILER.

1,343,197.   Specification of Letters Patent.   Patented June 15, 1920.

Original application filed July 2, 1917, Serial No. 178,168. Divided and this application filed January 28, 1918. Serial No. 214,067.

*To all whom it may concern:*

Be it known that I, WILLIAM T. DAUM, a citizen of the United States, residing at Oak Park, in the county of Cook and State of Illinois, have invented certain new and useful Improvements in Automobile-Trailers, of which the following is a specification.

This invention relates to trailers to be used manually or with automobiles or other vehicles, or for other purposes; and the general object of the invention is to produce an improved trailer for such use, and means for connecting the trailer and vehicle. The use of the trailer with a tractor is fully illustrated and described in my copending application filed July 2, 1917, Serial No. 178168, of which this application is a division, and to which reference may be made for a fuller understanding of the use of the trailer with a tractor.

In the accompanying drawings Figure 1 is an elevation of a trailer which embodies the features of my invention. Fig. 2 is a plan view of the trailer. Fig. 3 is a sectional view along the line 3—3 of Fig. 1.

To illustrate my invention I will consider it as applied to lumber use; but it may be applied to many other uses equally as well. In lumber yards or in factories requiring the use of much lumber, considerable time is required to load and unload the lumber from trucks; and to obviate the need of the traction vehicle, or the tractor, standing idle during a large portion of the time, it is desirable to have trailers which may readily be connected or disconnected from the tractor; and which, if desired, may be moved around more or less by hand, especially with light loads. For this purpose I provide a trailer comprising ordinary supporting wheels 10, and a frame 11 supported on the axle 12 of the wheels in any suitable manner, such as by springs 13. Fixed to the frame 11, in a manner hereinafter described, is a reach 14 which may be used as a handle for operating manually the trailer.

Any suitable traction means may be used. I prefer for the purpose automobiles or auto trucks adapted to receive the handle bar 15 of the trailer when the trailer is to be moved by the automobile.

When the trailer is to be loaded it is ordinarily separated from the tractor, and the reach is supported by any suitable means at a convenient height, and the lumber is piled ordinarily lengthwise with the trailer between the side stakes 22 and extending to or beyond the handle 15 if desired. The tractor is then backed under the reach, and the reach lowered so that the bar 15 may be connected with the tractor in any suitable manner. Any suitable means may be used to hold the lumber firmly in place.

In order to adapt the trailer to lumber of different lengths or for other purposes, I provide means for making the reach extensible. The rear portion of the reach comprises a frame consisting of the longitudinal beams 30 and the cross beams 31 rigidly connected. This frame is longitudinally slidably mounted in the frame 11 of the trailer between the cross beams 34 and the floor 35, guided by angle irons 36; and relative longitudinal movement of the two frames is prevented by means of pins 32 passing through the floor, the angle iron and the beams of both frames. A plurality of holes 33 provide means for adjusting the position of the reach frame with reference to the trailer frame so as to shorten or to lengthen the reach as desired. In order to vary the length of the reach it is necessary only to remove the pins from the holes in which they may be and slide the reach frame with reference to the trailer frame until two other holes on the respective sides register with the holes in the frame of the trailer, and then reinsert the pins.

I claim as my invention:

1. A two-wheeled cart comprising a frame, said frame having cross members spaced apart, a reach slidably mounted between said members, and means for rigidly connecting said frame and reach in adjusted positions, and a transverse handle on said reach.

2. A two wheeled cart comprising a frame, in combination with a reach slidably mounted in the frame of said cart, and a transverse handle on said reach, said frame comprising a floor and cross beams spaced apart, said reach passing between said floor and beams, and said floor and one of said beams each having an opening therethrough, the two openings registering with each other, and said reach having a plurality of openings, each of which by sliding said reach in said frame may be caused to register with said other two openings, and a pin adapted to pass through the three openings when so registering.

3. A cart comprising a frame in combination with a reach, said frame comprising a floor and cross beams spaced apart, said reach slidably positioned between said floor and beams, and means for connecting said frame and reach in adjusted positions.

4. A two wheel cart comprising a frame, in combination with a reach slidably mounted in the frame of said cart, and a transverse handle on said reach, said frame comprising a floor and transverse beams spaced apart, and said reach passing between said floor and beams, said floor having an opening therethrough, and one of said longitudinal beams having an opening therethrough registering with said first mentioned opening, and said reach having a plurality of openings each of which, by sliding said reach in said frame, may be caused to register with said other two openings, and a pin adapted to pass through the three openings when so registering.

In testimony whereof, I hereunto set my hand.

WILLIAM T. DAUM.